Aug. 24, 1965    H. J. GALBRAITH    3,202,960
ULTRASONIC DOPPLER SPEED MEASUREMENT DEVICE
Filed March 28, 1962    2 Sheets-Sheet 1
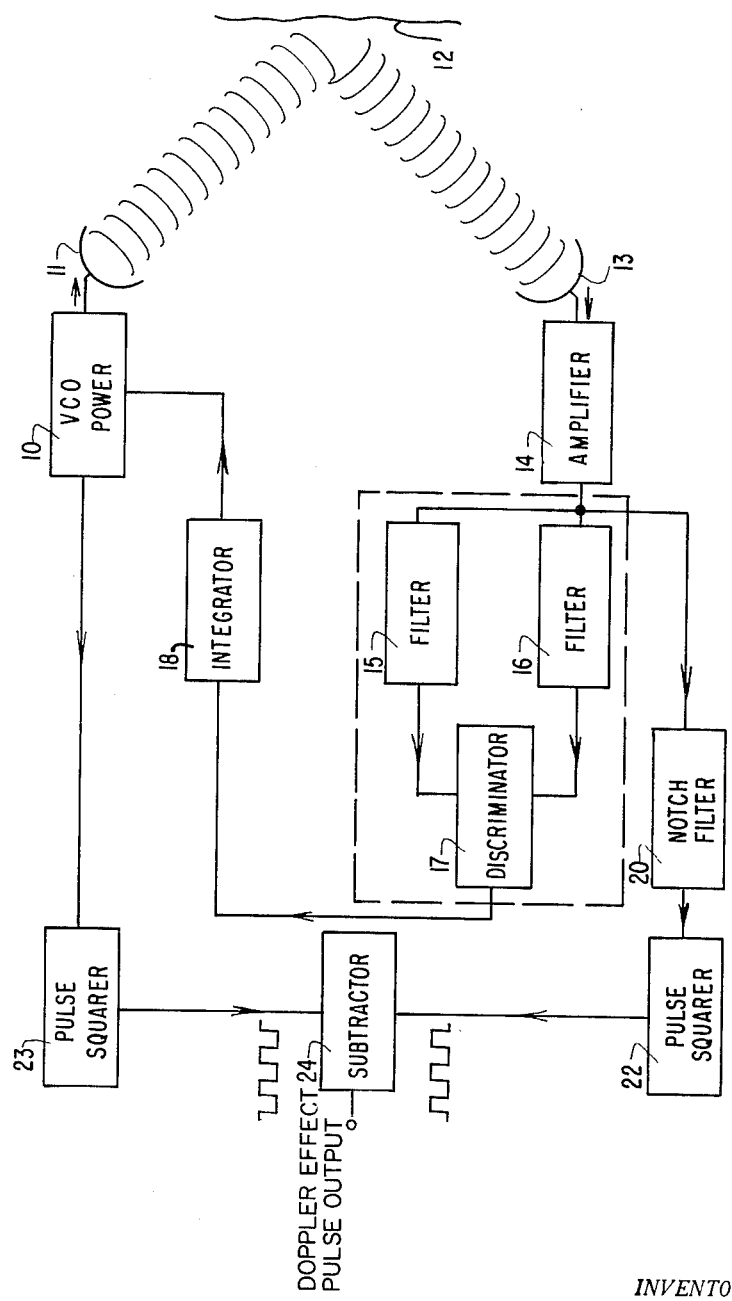
INVENTOR.
Hugh J. Galbraith
BY
Mueller and Aichele
Attys.

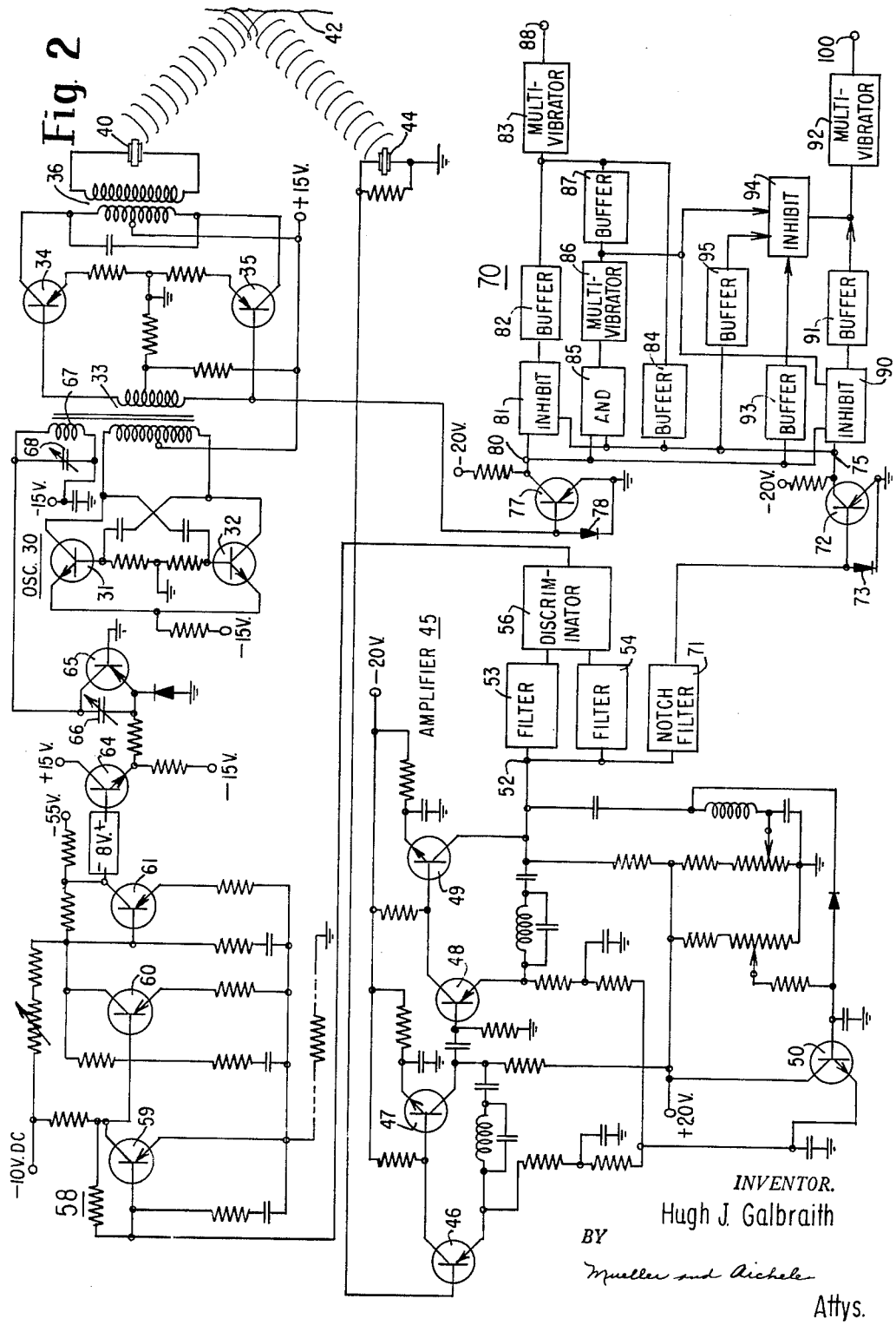

United States Patent Office 3,202,960
Patented Aug. 24, 1965

3,202,960
ULTRASONIC DOPPLER SPEED MEASUREMENT
DEVICE
Hugh J. Galbraith, Riverside, Calif., assignor to Motorola,
Inc., Chicago, Ill., a corporation of Illinois
Filed Mar. 28, 1962, Ser. No. 183,244
8 Claims. (Cl. 340—1)

This invention relates generally to navigation systems and more particularly to a simple and compact system which is suited for use as a personal navigation system.

Although devices have been proposed for personal navigation systems, the systems which have been available have been complex and not entirely suitable for personal use. Further, such systems have not provided indications which are sufficiently accurate and of a form which can be directly used.

It is particularly important in many instances to indicate relative movement between a person or other station and one or more objects, and this may include movement of the person as well as movement of the object. In accordance with the Doppler principle, a wave is changed in frequency by relative movement and this characteristic has been used in navigation devices. However, the systems using this principle have been complex, and the devices themselves have been expensive and too large for personal use.

It is therefore an object of the present invention to provide a simple and improved personal navigation system.

Another object of the invention is to provide a simple navigation system employing the Doppler frequency principle.

A further object of the invention is to provide a navigation system producing an output which directly indicates relative movement between the station and an object.

A feature of the invention is the provision of a navigation system including a closed loop for transmitting waves, receiving the waves after reflection from an object, and controlling the transmitted wave by the received wave, wherein the change in frequency upon reflection is determined to provide navigation information.

Another feature of the invention is the provision of a Doppler frequency tracking system including a transmitter of ultrasonic waves, a receiver for reflected waves, a discriminator for producing a control voltage which varies with the received frequency, and means for controlling the transmitter from the control voltage so that the received frequency has a particular value, with circuits responsive to the frequencies of the transmitted and received waves for producing an output which varies with the difference in such frequencies.

A further feature of the invention is the provision of a Doppler navigation system having the transmitted frequency controlled by the received frequency through a servo system, and wherein the received frequency is filtered and converted to a pulse wave and the transmitted frequency is also converted to a pulse wave, with the two pulse waves being applied to a subtractor circuit which produces an output pulse wave having a repetition frequency which forms a measure of the difference in frequencies between the transmitted and received waves.

Still another feature of the invention is the provision of a pulse addition and subtraction system wherein pulses from two sources are applied to two separate input circuits and are added and subtracted, with each of the input circuits including an inhibit gate to prevent passage of a pulse therein to the subtraction output when a pulse is simultaneously applied to the other input circuit, and a multivibrator producing an output pulse in response to each pulse from one input circuit when there is no corresponding pulse at the other input circuit. The system includes delay means to take care of instances when pulses occur at the two inputs not at exactly the same time but within the duration of a cycle, for correcting both the addition and subtraction outputs.

The invention is illustrated in the accompanying drawings wherein:

FIG. 1 is a block diagram of the navigation system in accordance with the invention; and FIG. 2 is a schematic diagram of the system with certain of the elements shown by complete circuits and other elements shown as block diagrams.

The navigation system in accordance with the invention provides a station including a generator for producing a wave which may be in the ultrasonic frequency range, or in a higher frequency range. The waves are directed from the station in a direction to be surveyed, and will be reflected from objects present in such a direction. The received waves are filtered and applied to a discriminator which produces a control voltage which varies as the received frequency varies from a selected frequency. The control voltage is applied through an integrator to control the generator and causes the generator frequency to be at a value such that the received wave is brought to the selected frequency. The generator will therefore produce a wave having a frequency differing from the selected frequency by the change in frequency which is produced by reflection. An indication of the change in frequency is produced by applying the received waves through a very sharp or notch filter to a pulse squarer circuit. The transmitted wave is also applied to a pulse squarer circuit, and the two pulse waves so derived are applied to a subtractor circuit. This circuit produces an output pulse wave having a repetition frequency corresponding to the change in frequency between the transmitted and received waves.

The subtracting action may take place in a combined addition and subtraction circuit including pulse gating devices wherein the two pulse waves are applied to separate inputs and separate addition and subtraction outputs are provided. Each input is inhibited when there is a pulse in the other input so that a pulse occurs at the subtractor output only when there is a pulse in one input and no corresponding pulse in the other input. A delay device is included to cause proper addition and subtraction action when the pulses occur within the duration of a cycle, but not precisely at the same time. Alternately, an indication of the change in frequency can be obtained by combining the sinusoidal transmitted and received waves in a mixer circuit to produce the difference frequency between the transmitted and received waves.

Referring now to the drawings, the navigation system of the invention is shown in FIG. 1 including a controlled oscillator 10 which provides a wave which may be in the ultrasonic range, as for example 200,000 cycles per second. It is pointed out that the system is not limited to use at such frequencies and other frequencies, such as in the microwave range may be used. The wave is applied to a transducer device 11, which may be one of various different types, such as a ferro-electric disc. The electrical waves are converted to compressional waves and are propagated by the transducer 11 and are reflected by objects which are generally indicated at 12. The reflected waves are picked up and converted back into electrical waves by a transducer device 13, which may be similar to the device 11. Such signals are amplified by amplifier 14 which may include an automatic gain control circuit to hold the output level within a limited range. The signals from the amplifier are applied to filters 15 and 16 which are tuned to adjoining frequency ranges extending above the frequency of the transmitter 10. The signals passed by the filters 15 and 16 are applied to discriminator 17 which produces a control voltage which varies with the frequency of the waves passed by filters 15 and 16 with relation to a selected frequency which is the center frequency of the discriminator. The control signal from discriminator 17 is applied to integrator 18 which smooths the signal to provide a control signal for controlling the frequency of oscillator 10.

It is therefore apparent that a closed loop is provided which includes the reflection path from transducer 11 to transducer 13, and which extends through the system from amplifier 14 through filters 15 and 16, discriminator 17 and integrator 18 to the oscillator 10, which applies waves to the transducer 11. The center frequency of the discriminator becomes the reference frequency for the system and is designated $f_0$. The frequency transmitted by oscillator 10 is $f_0 - f_d$, where $f_d$ represents the shift in frequency produced by the Doppler effect on reflection. This difference in frequency results either from movement of the station, where the navigation system is moved with respect to fixed objects, or movement of objects with respect to the navigation station, or both.

To obtain a measure of the velocity of the relative movement, the wave from the amplifier 14 is applied to a notch or sharp bandpass filter 20. The wave from the notch filter is substantially of sinusoidal waveform, and as the filter is quite sharp the output is substantially a single frequency. This wave is applied to pulse squarer 22. The wave from the oscillator 10, which is also of sinusoidal wave form, is applied to the pulse squarer 23. The two pulse waves from the squarers 22 and 23 are applied to subtractor circuit 24 which provides an output pulse wave, with the pulse repetition frequency representing the difference in frequency of the wave transmitted with respect to the wave received. This pulse wave is, therefore, a measure of the Doppler shift in frequency and represents the velocity of relative movement between the station and an object. That is, the output of the subtractor 24 is $f_d$, which is the difference between the transmitted frequency and the received frequency.

FIG. 2 shows the navigational system of the invention in more complete detail form. Signals are generated in the oscillator 30 which is of the balanced type including transistors 31 and 32. These signals are applied through transformer 33 to the power amplifier formed by transistors 34 and 35. The amplified signals are applied through transformer 36 to the crystal transducer 40. The transducer applies ultrasonic waves in the direction in which movement is to be detected, with the waves being reflected from objects indicated as 42. The reflected waves are picked up by transducer 44 and applied to the input of amplifier 45. This amplifier includes four stages provided by transistors 46, 47, 48 and 49. An automatic gain control circuit including transistor 50 is provided to hold the output level of the amplifier within a limited region. The output of the amplifier 45 from terminal 52 is applied to filters 53 and 54 which select signals in adjacent frequency bands as set forth with respect to filters 15 and 16 of FIG. 1. The output of the filters is applied to discriminator 56 which provides a control voltage which varies with the frequency of the main energy of the received wave.

The control voltage is applied to the integrator circuit 58 which includes transistors 59, 60 and 61. This smooths and amplifies the control signal to provide a suitable control voltage for the control stage including transistors 64 and 65. The control stage controls the effective value of the capacitor 66 which is connected in series with the tuned circuit including inductor 67 and capacitor 68. The inductor 67 is coupled to the transformer 33 to control the frequency of the oscillator 30. This completes the feedback loop which controls the frequency of oscillation so that the received frequency corresponds to the center frequency of the discriminator 56. It is pointed out again that the transmitted frequency will not correspond to the frequency of the discriminator 56 because of the change in frequency upon reflection of the waves. The oscillator 30 will be controlled so that its frequency differs from the received frequency by the change of frequency produced in the reflection path.

To measure the change in frequency a subtractor circuit 70 is provided which corresponds to the subtractor circuit 24 of FIG. 1. The received wave from the output 52 of amplifier 45 is applied through bandpass filter 71, which may also be called a notch filter as it provides frequencies in a restricted frequency range only. The output of this filter, which is substantially of sinusoidal wave form is applied to the pulse squarer circuit including transistor 72 and diode 73. The output of the squarer circuit is applied to the input terminal 75 of the circuit 70. The wave from the oscillator 30 is derived from the base of transistor 35 and applied to the pulse squarer circuit including transistor 77 and diode 78. The output of this squarer circuit is applied to input terminal 80 of the subtractor circuit 70.

The circuit 70 as illustrated provides both addition and subtraction. The circuit includes a plurality of gate stages which are of two types, an "and" gate and "inhibit" gates. The circuit also includes one shot multivibrator stages and buffer or isolating stages.

Considering first the adding action produced by the circuit 70, pulses from input 80 are applied through inhibit stage 81 and buffer stage 82 to the multivibrator 83. Similarly, pulses from the input 75 are applied through buffer stage 84 to the multivibrator 83. Accordingly, pulses from both sources are applied to the multivibrator 83, which is of the one shot type and produces an output pulse at terminal 88 for each input pulse applied thereto.

In the event that pulses are applied simultaneously from inputs 75 and 80 these pulses would be applied simultaneously to the multivibrator 83 so that it would appear that only one pulse is applied and the other pulse would be lost. This action would take place even if only parts of the pulses at inputs 75 and 80 occur simultaneously. This is overcome by the circuit which includes an "and" gate 85 which operates when any parts of pulses are simultaneously applied to the inputs 75 and 80. The "and" stage 85 actuates multivibrator 86 which provides a delayed pulse. The delayed pulse from multivibrator 86 is applied through buffer stage 87 to the multivibrator 83 to make up for the pulse which was lost because of the coincidence of the two input pulses. In order to prevent interference by the two simultaneous pulses, the inhibit gate 81 blocks the pulse from input 80 if a pulse is simultaneously applied from the input 75. It is therefore seen that the multivibrator 83 provides a pulse at output terminal 88 for each input pulse and in effect adds the input pulses.

Considering the subtraction action, pulses from input 75 are applied through inhibit gate 90 and buffer stage 91 to multivibrator 92, which provides the subtraction output at 100. In the event that a pulse is simultaneously applied from input 80, this will actuate the inhibit gate 90 so that no pulse will be applied to the multivibrator 92. This provides the subtraction action desired. Similarly pulses from input 80 are applied through buffer 93 and inhibit gate 94 to the multivibrator 92. To prevent such pulses reaching the multivibrator when a pulse is present at input 75, the pulse from 75 acts through buffer stage 95 to operate inhibit gate 94 to prevent the passage of the pulse from input 80. Accordingly, either input to the multivibrator is blocked when a pulse is present from the other input.

To provide subtraction action when the pulses are not completely coincident, the delayed pulse from multivibrator 86, which is actuated by "and" gate 85, is applied to both inhibit gates 90 and 94. This prevents the passage of a pulse even though the pulse from the other input has been delayed, to thereby take care of all possible conditions. This latter circuit takes care of instances in which a pulse in one line is delayed by more than a pulse duration but less than one complete cycle.

It is therefore seen that a simple system is provided which produces an output which is a measure of the velocity of the navigation device with respect to an object. As fully explained this may result from movement of either the device or the object, or both. The device may be provided as a compact unit by use of transistor circuits so that it is suitable for personal use.

I claim:

1. A system for producing an output pulse wave which indicates the difference in frequency between first and second waves including in combination, first and second pulse squarer means, means for applying said first and second waves to said first and pulse squarer means respectively for producing first and second output pulse waves, first and second inhibit gate means, means for applying said first and second pulse waves to said first and second gate means respectively, means applying said first pulse wave to said second gate means to inhibit action thereof, coincidence gate means producing a pulse when pulses of said first and second pulse waves occur simultaneously, delay means coupled to said coincidence gate means for producing a delayed pulse in response to a pulse from said coincidence gate means, means applying said second pulse wave and said delayed pulses to said first gate means to inhibit action thereof, and multivibrator means coupled to said first and second gate means for producing an output pulse in response to pulses from said first and second gate means.

2. A pulse subtractor circuit for producing an output pulse wave corresponding in frequency to the difference in frequency of first and second pulse waves including in combination, first and second inhibit gate means, means for applying the first and second pulse waves to said first and second gate means respectively, means applying said first pulse wave to said second gate means to inhibit action thereof, coincidence gate means producing a pulse when pulses of first and second pulse waves occur simultaneously, delay means coupled to said coincidence gate means for producing a delayed pulse in response to a pulse from said coincidence gate means, means applying said second pulse wave and said delayed pulses to said first gate means to inhibit action thereof, and multivibrator means coupled to said first and second gate means for producing an output pulse in response to pulses from said first and second gate means.

3. A navigation system including in combination, generator means for producing a first electrical wave of ultrasonic frequency, first transducer means coupled to said generator means for converting said first electrical wave to a compressional wave and for propagating such compressional wave, second transducer means for receiving said compressional wave after reflection and converting the same to a second electrical wave, amplifier means coupled to said second transducer means for amplifying said second electrical wave, filter means coupled to said amplifier means for selecting a band of frequencies of said second electrical wave, discriminator means coupled to said filter means for producing a control signal which varies with the frequency of said second electrical wave, integrator means coupled to said discriminator means for smoothing and amplifying said control signal, means coupling said integrator means to said generator means for controlling the frequency of said first electrical wave to minimize said control signal, a band pass filter coupled to said amplifier means for sharply selecting said second electrical wave, first pulse squarer means coupled to said band pass filter for producing a first pulse wave at the output thereof, second pulse squarer means coupled to said generator means for producing a second pulse wave from said first electrical wave, and subtractor means coupled to said first and second pulse squarer means for producing an output signal having a frequency equal to the difference between the frequencies of said first and second pulse waves.

4. A navigation system positioned at a station for indicating relative movement between the station and an object, said system including in combination, generator means for producing a first electrical wave of ultrasonic frequency, first transducer means coupled to said generator means for converting said first electrical wave to a compressional wave and for directing such compressional wave toward the object, second transducer means for receiving said compressional wave after reflection from the object and for converting the same to a second electrical wave, amplifier means coupled to said second transducer means for amplifying said second electrical wave, discriminator means coupled to said amplifier means for producing a control signal which varies with the frequency of said second electrical wave, integrator means coupled to said discriminator means for smoothing said control signal, means coupling said integrator means to said generator means for controlling the frequency of said first electrical wave to minimize said control signal, a band pass filter coupled to said amplifier means for sharply selecting said second electrical wave, first pulse squarer means coupled to said band pass filter for producing a first pulse wave at the output thereof, second pulse squarer means coupled to said generator means for producing a second pulse wave from said first electrical wave, and subtractor means coupled to said first and second pulse squarer means for producing an output signal representing the Doppler frequency components of said first pulse wave which are not present in said second pulse wave, to thereby indicate the relative movement between the station and the object.

5. A navigation system positioned at a station for indicating relative movement between the station and an object, said system including in combination, generator means for producing a first electrical wave of ultrasonic frequency, first transducer means coupled to said generator means for converting said first electrical wave to a compressional wave and for directing such compressional wave toward the object, second transducer means for receiving the reflected compressional wave from the object and for converting the same to a second electrical wave, with the reflected wave including Doppler frequency components produced by the relative movement, amplifier means coupled to said second transducer means for amplifying said second electrical wave, filter means coupled to said amplifier means for selecting a band of frequencies of said second electrical wave, discriminator means coupled to said filter means for producing a control signal which varies with the frequency of the said second electrical wave, integrator means coupled to said discriminator means for smoothing and amplifying said control signal, means coupling said integrator means to said generator means for controlling the frequency of said first electrical wave to minimize said control signal, a band pass filter coupled to said amplifier means for sharply selecting said second electrical wave, first pulse squarer means coupled to said band pass filter for producing a first pulse wave at the output thereof, second pulse squarer means coupled to said generator means for producing a second pulse wave from said first electrical wave, and subtractor means coupled to said first and second pulse squarer means for producing an output wave including pulses corresponding in number to the difference between the number of pulses in said first and second pulse waves, said output wave representing the Doppler frequency change in said compressional wave to thereby indicate the relative movement between the station and the object.

6. A navigation system including in combination, generator means for producing a first electrical wave, first transducer means coupled to said generator means for converting said first electrical wave into a compressional wave and for propagating such compressional wave, second transducer means for receiving said compressional wave after reflection and for converting the same to a second electrical wave, amplifier means coupled to said second transducer means for amplifying said second electrical wave, discriminator means coupled to said amplifier means for producing a control signal which varies with the frequency of said second electrical wave, integrator means coupled to said discriminator means for smoothing said control signal, means coupling said integrator means to said generator means for controlling the frequency of said first electrical wave to minimize said control signal, a band pass filter coupled to said amplifier means for sharply selecting said second electrical wave, and combining means coupled to said generator means and to said band pass filter for producing an output signal having a frequency equal to the difference between the frequencies of said first and second electrical waves, said combining means including first and second pulse squarer means connected to said generator means and to said band pass filter respectively for producing first and second pulse waves at the outputs thereof, first and second inhibit gate means, means for applying said first and second pulse waves to said first and second gate means respectively, means applying said first pulse wave to said second gate means to inhibit action thereof, means applying said second pulse wave to said first gate means to inhibit action thereof, and multivibrator means coupled to said first and second gate means for producing an output pulse in response to each pulse from said first and second gate means.

7. A navigation system including in combination, generator means for producing a first electrical wave, transducer means for converting an electrical wave to a compressional wave and for propagating such compressional wave and for receiving a compressional wave and converting the same into an electrical wave, said transducer means including an input terminal for receiving an electrical wave for conversion to a compressional wave and an output terminal at which appears an electrical wave derived from the received compressional wave, means coupling said generator means to said input terminal of said transducer means whereby said transducer means converts said first electrical wave into a compressional wave and propagates such compressional wave, said transducer means receiving said compressional wave after reflection and converting the same into a second electrical wave which appears at said output terminal, amplifier means coupled to said output terminal of said transducer means for amplifying said second electrical wave, discriminator means coupled to said amplifier means for producing a control signal which varies with the frequency of said second electrical wave, integrator means coupled to said discriminator means for smoothing said control signal, means coupling said integrator means to said generator means for controlling the frequency of said first electrical wave to minimize said control signal, a band pass filter coupled to said amplifier means for sharply selecting said second electrical wave, pulse squarer means coupled to said band pass filter and to said generator means for converting the electrical waves therefrom into rectangular waves, and means coupled to said pulse squarer means for processing said rectangular waves.

8. A navigation system including in combination, generator means for producing a first electrical wave, first transducer means coupled to said generator means for converting said first electrical wave to a compressional wave and for propagating such compressional wave, second transducer means for receiving said compressional wave after reflection and converting the same into a second electrical wave, amplifier means coupled to said second transducer means for amplifying said second electrical wave, discriminator means coupled to said amplifier means for producing a control signal which varies with the frequency of said second electrical wave, integrator means coupled to said discriminator means for smoothing said control signal, means coupling said integrator means to said generator means for controlling the frequency of said first electrical wave to minimize said control signal, a band pass filter coupled to said amplifier means for sharply selecting said second electrical wave, and subtractor means coupled to said generator means and to said band pass filter for producing an output wave having a frequency equal to the difference between the frequencies of said first and second electrical waves, said subtractor means including first and second pulse squarer means connected to said generator means and to said band pass filter respectively for producing first and second pulse waves, first and second inhibit gate means, means for applying said first and second pulse waves to said first and second gate means respectively, means applying said first pulse wave to said second gate means to inhibit action thereof, coincidence gate means producing a pulse when pulses of said first and second pulse waves occur simultaneously, delay means coupled to said coincidence gate means for producing a delayed pulse in response to a pulse from said coincidence gate means, means applying said second pulse wave and said delayed pulses to said first gate means to inhibit action thereof, and multivibrator means coupled to said first and second gate means for producing an output pulse in response to each pulse from said first and second gate means.

References Cited by the Examiner

UNITED STATES PATENTS

| | | | |
|---|---|---|---|
| 2,935,743 | 5/60 | Glegg | 343—8 |
| 2,974,222 | 3/61 | Lawson | 343—8 |
| 2,985,773 | 5/61 | Dobbie | 324—79 |
| 3,009,143 | 11/61 | Clarke | 343—8 |
| 3,058,063 | 10/62 | Sher | 324—79 |
| 3,069,623 | 12/62 | Murgio | 324—79 |

CHESTER L. JUSTUS, *Primary Examiner.*